(12) United States Patent
Iida et al.

(10) Patent No.: US 9,927,656 B2
(45) Date of Patent: Mar. 27, 2018

(54) LIQUID CRYSTAL PANEL AND POLARIZING LAMINATE FOR USE IN THE LIQUID CRYSTAL PANEL

(71) Applicant: NITTO DENKO CORPORATION, Ibaraki-shi, Osaka (JP)

(72) Inventors: Toshiyuki Iida, Fukuyama (JP); Takeharu Kitagawa, Onomichi (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/646,355

(22) PCT Filed: Sep. 3, 2014

(86) PCT No.: PCT/JP2014/073160
§ 371 (c)(1),
(2) Date: May 20, 2015

(87) PCT Pub. No.: WO2015/064205
PCT Pub. Date: May 7, 2015

(65) Prior Publication Data
US 2015/0293407 A1    Oct. 15, 2015

(30) Foreign Application Priority Data

Oct. 31, 2013 (JP) ................................ 2013-227095
May 9, 2014 (JP) ................................ 2014-097503

(51) Int. Cl.
*G02F 1/1335* (2006.01)
*G02F 1/13363* (2006.01)
(Continued)

(52) U.S. Cl.
CPC .. *G02F 1/133634* (2013.01); *G02F 1/133528* (2013.01); *G02F 1/134363* (2013.01);
(Continued)

(58) Field of Classification Search
CPC combination set(s) only.
See application file for complete search history.

(56) References Cited

U.S. PATENT DOCUMENTS 6,115,095 A   9/2000  Suzuki et al.
8,257,611 B2  9/2012  Uehira et al.
(Continued)

FOREIGN PATENT DOCUMENTS

JP   11-133408 A    5/1999
JP   2002-301788 A1 10/2002
(Continued)

OTHER PUBLICATIONS

Extended European search report dated Jun. 15, 2016 in connection with the counterpart European Patent Application No. 14858217.4-1904.
(Continued)

*Primary Examiner* — Nathanael R Briggs
*Assistant Examiner* — Alexander Gross
(74) *Attorney, Agent, or Firm* — Hauptman Ham, LLP

(57) ABSTRACT

A liquid crystal panel which is capable of significantly reducing a thickness thereof as compared to conventional liquid crystal panels, and, when used in a liquid crystal display device using a liquid crystal cell such as an IPS-type liquid crystal cell, reducing oblique light leakage in a black state of the liquid crystal display device to enhance contrast.

2 Claims, 1 Drawing Sheet

(51) Int. Cl.
*G02F 1/1343* (2006.01)
*G02F 1/1333* (2006.01)

(52) U.S. Cl.
CPC ............ *G02F 2001/133311* (2013.01); *G02F 2201/50* (2013.01); *G02F 2202/40* (2013.01); *G02F 2203/64* (2013.01); *G02F 2413/06* (2013.01); *G02F 2413/12* (2013.01); *G02F 2413/13* (2013.01); *G02F 2413/14* (2013.01)

(56) References Cited

U.S. PATENT DOCUMENTS

| | | | |
|---|---|---|---|
| 8,274,627 | B2 | 9/2012 | Tomonaga et al. |
| 8,743,320 | B2 | 6/2014 | Lee et al. |
| 2006/0114383 | A1 | 6/2006 | Kobayashi et al. |
| 2009/0109385 | A1 | 4/2009 | Nagase et al. |
| 2010/0045901 | A1 | 2/2010 | Uehira et al. |
| 2010/0073610 | A1* | 3/2010 | Fukuda ................ G02B 5/3025 349/96 |
| 2010/0157207 | A1 | 6/2010 | Lee et al. |
| 2010/0309414 | A1* | 12/2010 | Tomonaga ............ G02B 5/3041 349/96 |
| 2011/0206869 | A1* | 8/2011 | Nemoto ............... C08G 18/672 428/1.54 |
| 2011/0315306 | A1 | 12/2011 | Goto et al. |
| 2012/0028041 | A1* | 2/2012 | Koyama .................. C09J 4/06 428/354 |
| 2012/0052197 | A1 | 3/2012 | Sawada et al. |
| 2012/0055607 | A1 | 3/2012 | Kitagawa et al. |
| 2012/0055608 | A1 | 3/2012 | Kitagawa et al. |
| 2012/0055621 | A1 | 3/2012 | Goto et al. |
| 2012/0055622 | A1 | 3/2012 | Kitagawa et al. |
| 2012/0055623 | A1 | 3/2012 | Kitagawa et al. |
| 2012/0056211 | A1 | 3/2012 | Kitagawa et al. |
| 2012/0056340 | A1 | 3/2012 | Kitagawa et al. |
| 2012/0057104 | A1 | 3/2012 | Kitagawa et al. |
| 2012/0057107 | A1 | 3/2012 | Kitagawa et al. |
| 2012/0057231 | A1 | 3/2012 | Goto et al. |
| 2012/0057232 | A1 | 3/2012 | Goto et al. |
| 2012/0058291 | A1 | 3/2012 | Kitagawa et al. |
| 2012/0058321 | A1 | 3/2012 | Kitagawa et al. |
| 2012/0327512 | A1 | 12/2012 | Goto et al. |
| 2013/0100529 | A1 | 4/2013 | Kitagawa et al. |
| 2013/0114139 | A1 | 5/2013 | Kitagawa et al. |
| 2014/0016198 | A1 | 1/2014 | Sawada et al. |
| 2014/0044947 | A1 | 2/2014 | Sawada et al. |
| 2014/0186568 | A1 | 7/2014 | Kitagawa et al. |
| 2014/0218665 | A1 | 8/2014 | Lee et al. |
| 2015/0109561 | A1 | 4/2015 | Fuchida et al. |

FOREIGN PATENT DOCUMENTS

| | | |
|---|---|---|
| JP | 2006-178401 A | 7/2006 |
| JP | 2008-009389 A | 1/2008 |
| JP | 2010-180350 A | 8/2010 |
| JP | 4751481 B1 | 8/2011 |
| JP | 4751486 B2 | 8/2011 |
| JP | 2012-048046 A | 3/2012 |
| JP | 4938632 B2 | 5/2012 |
| JP | 2013-092546 A | 5/2013 |
| JP | 5244848 B2 | 7/2013 |
| KR | 20080064803 A | 7/2008 |
| TW | 399588 B | 7/2009 |
| TW | 201333557 A | 8/2013 |
| WO | 2008072794 A1 | 6/2008 |
| WO | 2013154125 A1 | 10/2013 |

OTHER PUBLICATIONS

Taiwanese Office Action dated Feb. 23, 2016 in connection with the counterpart Taiwanese Patent Application No. 103132067.
International Search Report for Application No. PCT/JP2014/073160, dated Nov. 25, 2014.
Written Opinion for application No. PCT/JP2014/073160 dated Nov. 25, 2014.
Office Action dated Dec. 19, 2016 from Japanese Patent Office in connection with the counterpart Japanese patent application No. 2014-97503.
Korean Office Action dated Aug. 3, 2016 in connection with the counterpart Korean Patent Application No. 10-2015-7013472.

* cited by examiner

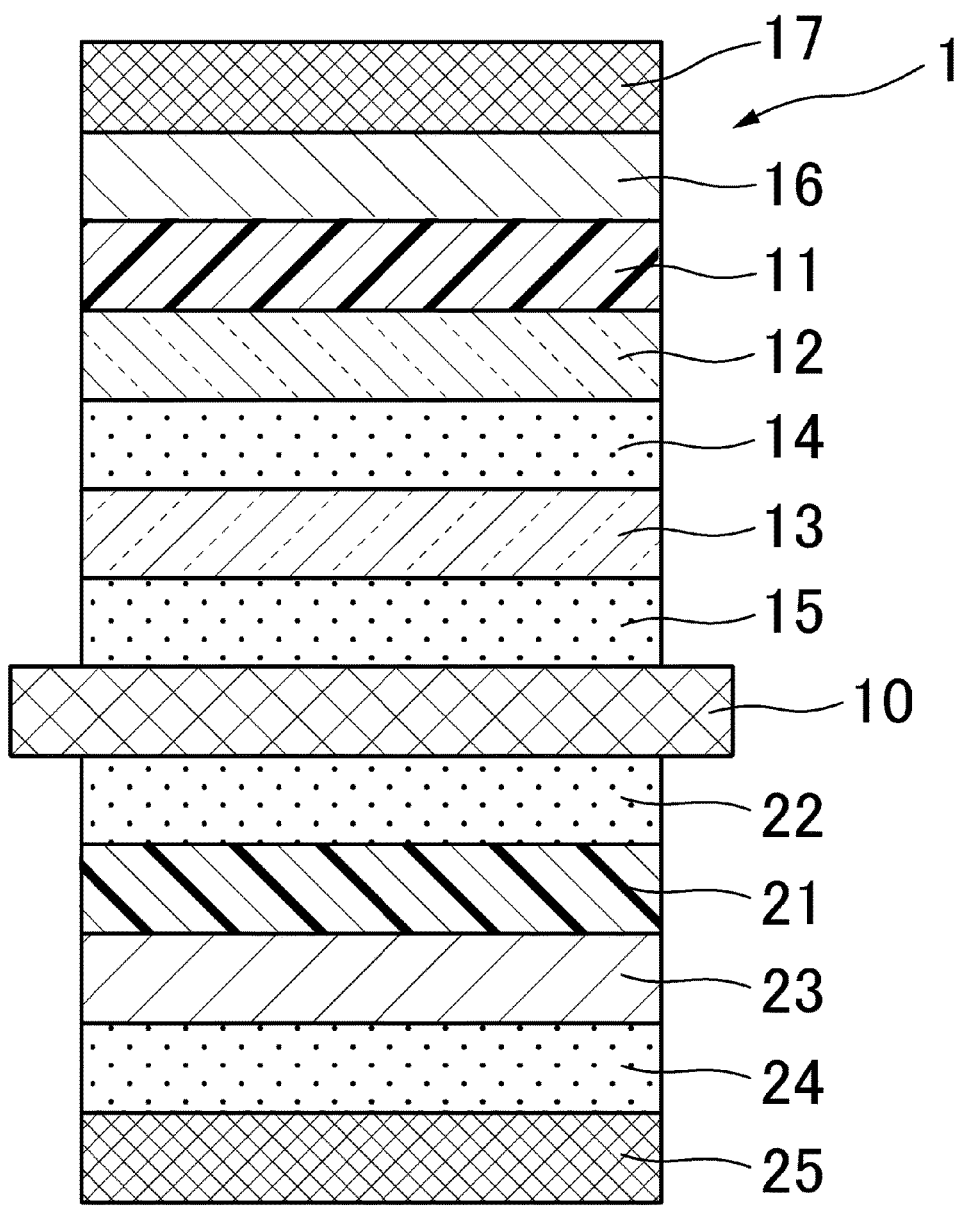

LIQUID CRYSTAL PANEL AND POLARIZING LAMINATE FOR USE IN THE LIQUID CRYSTAL PANEL

CROSS REFERENCE TO RELATED APPLICATION

This application claims the priority of Japanese Patent Application No. 2013-227095, filed on Oct. 31, 2013 and Japanese Patent Application No. 2014-097503, filed on May 9, 2014 in the Japanese Patent and Trademark Office. Further, this application is the National Phase application of International Application No. PCT/JP2014/073160 filed on Sep. 3, 2014, which is incorporated herein by reference in its entirety.

TECHNICAL FIELD

The present invention relates to a liquid crystal panel. In particular, the present invention relates to a liquid crystal panel wherein a pair of polarizers are disposed, respectively, on opposite sides of a liquid crystal cell containing liquid crystal molecules oriented or aligned in one direction in a plane of the cell under an electric field-off state, such as an IPS-type liquid crystal cell, and wherein a retardation layer is combined with one of the polarizers for viewing angle compensation. The present invention also relates to a laminate comprising a polarizer and a retardation layer for use in such a liquid crystal panel.

BACKGROUND ART

An IPS-type liquid crystal cell is configured to, under an electric field-off state, achieve a homogeneous orientation or alignment of liquid crystal molecules in which liquid crystal molecules are uniformly oriented or aligned in one direction in a plane of the liquid crystal cell. In a liquid crystal display device equipped with such an IPS-type liquid crystal cell having a structure as described above, a pair of polarizers are disposed, respectively, on opposite sides of the liquid crystal cell in such a manner that absorption axes of the polarizers orthogonally intersect each other. Further, one of the polarizers is disposed with respect to the liquid crystal cell such that the absorption axis of the one polarizer is aligned in parallel to the orientation direction of the liquid crystal molecules in the electric field-off state. Typically, this electric field-off state corresponds to a "black state". On the other hand, a "white state" is achieved by applying an electric field to the liquid crystal cell to rotate the liquid crystal molecules horizontally in the plane of the cell to thereby cause phase retardation of light through the liquid crystal cell in such a manner that the light which has passed through the one polarizer is transmitted through the other polarizer. The "white state" is achieved when the liquid crystal molecules are oriented along axes each bisecting an intersecting angle between the absorption axes of the pair of polarizers, or, in other words, the liquid crystal molecules are oriented at an orientation angle of 45° with respect to the absorption axes of the polarizers, to provide a maximum light transmittance. In actual practice, however, it is difficult to have the liquid crystal molecules rotated to the position of the ideal orientation angle of 45°, and therefore an orientation angle substantially equal to, or close to, 45° is treated as being within the coverage of the "white state". A liquid crystal display device is called as "O-mode" if the polarizer located at an illumination source-side has its absorption axis parallel to the orientation direction of the liquid crystal molecules in the electric field-off state, whereas, it is called as "E-mode" if the polarizer at a viewing-side has its absorption axis parallel to the orientation direction of the liquid crystal molecules in the electric field-off state.

In a liquid crystal display device equipped with the IPS-type liquid crystal cell, problems have been experienced in that, when a user observes a display screen at an angle of 45° with respect to the absorption axis of the viewing side polarizers and obliquely with respect to the plane of the liquid crystal cell, there is a decrease in contrast, and a change in display color is visually recognized when observed from different angles. In view of the problems, proposals have been made by, for example, the Patent Documents 1 and 2 which propose disposing a plurality of retardation films on one side of the liquid crystal cell to thereby solve the above problems. Further, as more effective solution than the proposals by the Patent Documents 1 and 2, the Patent Document 3 proposes to use two retardation films consisting of a "negative biaxial plate" and a "positive biaxial plate", in combination with the one polarizer. According to this proposal, the negative biaxial plate is defined as an optical component having a relationship of $nx1 > ny1 > nz1$, where $nx1$ represents a refractive index in a slow axis (x-axis) direction, $ny1$ represents a refractive index in a fast axis (y-axis) direction, and $nz1$ represents a refractive index in a thickness-wise (z-axis) direction, whereas the positive biaxial plate is defined as an optical component having a relationship of $nz2 > nx2 > ny2$, where $nx2$ represents a refractive index in the slow axis (x-axis) direction, $ny2$ represents a refractive index in the fast axis (y-axis) direction, and $nz2$ represents a refractive index in the thickness-wise (z-axis) direction. Further, in the Patent Document 3, in-plane and thickness-wise retardation values of the negative and positive biaxial plates, and mutual relationships of the retardation values, are specified in detail. According to the teachings of the Patent Document 3, the arrangement proposed by this Document makes it possible to reduce light leakage in the oblique direction in a black state of a liquid crystal display device to enhance contract.

CITATION LIST

Parent Document

Parent Document 1: JP 11-133408A
Parent Document 2: JP 2006-178401A
Parent Document 3: JP 4938632B
Parent Document 4: JP 4751481B
Parent Document 5: JP 4751486B
Parent Document 6: JP 5244848B

SUMMARY OF INVENTION

Technical Problem to be Solved by the Invention

A recent key issue in liquid crystal display devices is a reduction in thickness thereof. Particularly, in a liquid crystal display device formed by having a polyvinyl alcohol-based layer impregnated with iodine so that the iodine is adsorbed to the polyvinyl alcohol-based layer, dimensional changes such as expansion and contraction occur in the polyvinyl alcohol-based layer under environmental conditions such as surrounding temperature and humidity, to such an extent that a stress due to the dimensional changes gives rise to a distortion in an adjacent optical film, causing deterioration in image quality. There is also a strong need to reduce a thickness of the entire device. The technique proposed in the Patent Document 3 may be effective, in a liquid crystal display device using a liquid crystal cell containing liquid crystal molecules oriented in one direction in a plane of the liquid crystal cell in an electric field-off state, such as an IPS-type liquid crystal cell, for reducing oblique light leakage in a black state of the liquid crystal display device to enhance contrast. However, a reduction in thickness of each layer is not taken into consideration at all.

In view of such circumstances, the present invention addresses a technical problem of providing a liquid crystal panel capable of significantly reducing an overall thickness thereof as compared to conventional liquid crystal panels, and, when used in a liquid crystal display device having a liquid crystal cell containing liquid crystal molecules oriented in one direction in a plane thereof in an electric field-off state, such as an IPS-type liquid crystal cell, reducing oblique light leakage in a black state of the liquid crystal display device to enhance contrast.

The present invention also addresses another technical problem of providing a laminate comprising a polarizer and a retardation layer, and suitably usable in a liquid crystal display device using a liquid crystal cell containing liquid crystal molecules oriented in one direction in a plane thereof in an electric field-off state, such as an IPS-type liquid crystal cell.

Solution to Technical Problem

According to one aspect of the present invention, there is provided a liquid crystal panel which comprises a liquid crystal cell having a liquid crystal layer containing liquid crystal molecules oriented in one direction in a plane thereof in an electric field-off state, such as an IPS-type liquid crystal cell. A first polarizer is disposed on one of opposite sides of the liquid crystal cell, and a second polarizer is disposed on the other side of the liquid crystal cell. The first and second polarizers are arranged in such a manner that absorption axes thereof orthogonally intersects each other. A first retardation layer and a second retardation layer are provided between the first polarizer and the liquid crystal cell and arranged in this order from the side of the first polarizer, wherein the first retardation layer is configured to satisfy the relationship of $nx1 > ny1 > nz1$, where $nx1$ represents a refractive index in an in-plane slow axis (x-axis) direction, $ny1$ represents a refractive index in an in-plane fast axis (y-axis) direction, and $nz1$ represents a refractive index in a thickness-wise (z-axis) direction, and the second retardation layer is configured to satisfy the relationship of $nz2 > nx2 > ny2$, where: $nx2$ represents a refractive index in the in-plane slow axis (x-axis) direction, $ny2$ represents a refractive index in the in-plane fast axis (y-axis) direction, and $nz2$ represents a refractive index in the thickness (z-axis) direction. Further, the slow axis of the first retardation layer is disposed parallel to the slow axis of the second retardation layer.

In the liquid crystal panel of the present invention, each of the first polarizer and the second polarizer has a thickness of 10 μm or less, and exhibits optical properties having a single transmittance of 40.0% or more and a polarization degree of 99.8% or more.

The second polarizer is directly bonded to the liquid crystal cell through a pressure-sensitive adhesive layer in such a manner that the absorption axis thereof is disposed approximately parallel to an orientation direction of the liquid crystal molecules of the liquid crystal cell in the electric field-off state.

Further, the second polarizer is provided with a protective layer laminated to a surface thereof on a side opposite to the liquid crystal cell, through a pressure-sensitive adhesive layer, wherein the protective layer has a thickness of 10 to 50 μm, and exhibits a moisture permeability of 200 g/m$^2$ or less.

The first retardation layer has a thickness of 25 μm or less, preferably, 3 to 25 μm as presented in Table 1, and exhibits a moisture permeability of 200 g/m$^2$ or less, wherein a value of $\Delta nxy1$ and a value of $\Delta nxz1$ are set, respectively, to 0.0036 or more, preferably, 0.0036 to 0.014 as represented in Table 1, and 0.0041 or more, preferably, 0.0041 to 0.0238 as represented in Table 1, and Re and Rth are set, respectively, in the range of 90 nm to 140 nm and the range of 100 nm to 240 nm, where: $\Delta nxy1$ represents an in-plane refractive index difference which is a difference between the refractive index $nx1$ in the slow axis direction and the refractive index $ny1$ in the fast axis direction; $\Delta nxz1$ represents a thicknesswise refractive index difference which is a difference between the refractive index $nx1$ in the slow axis direction and the refractive index $nz1$ in the thickness (z-axis) direction; Re represents an in-plane retardation; and Rth represents a thicknesswise retardation expressed in the following formula: $Rth = (nx1 - nz1) \times d1$, where $d1$ represents a thickness of the first retardation layer.

The second retardation layer has a thickness of 20 μm or less, preferably, 1 to 20 μm as presented in Table 1, wherein a value of $\Delta nxy2$ and a value of $\Delta nxz2$ are set, respectively, to 0.0008 or more, preferably, 0.0008 to 0.010 as presented in Table 1, and −0.0030 or less, preferably, −0.0220 to −0.0030 as presented in Table 1, and Re and Rth are set, respectively, in the range of 15 nm to 50 nm and the range of −110 nm to −60 nm, where: $\Delta nxy2$ represents a difference between the refractive index $nx2$ in the slow axis direction and the refractive index $ny2$ in the fast axis direction; $\Delta nxz2$ represents a difference between the refractive index $nx2$ in the slow axis direction and the refractive index $nz2$ in the thickness (z-axis) direction; Re represents an in-plane retardation; and Rth represents a thicknesswise retardation expressed in the following formula: $Rth = (nx2 - nz2) \times d2$, where $d2$ represents a thickness of the second retardation layer.

TABLE 1

| | Thickness | In-plane retardation | Thicknesswise retardation |
|---|---|---|---|
| First retardation layer ($nx > ny > nz$) | 3 μm ≤ d ≤ 25 μm | 0.0036 ≤ Δnxy ≤ 0.014 | 0.0041 ≤ Δnxz ≤ 0.0238 |
| Second retardation layer ($nz > nx > ny$) | 1 μm ≤ d ≤ 20 μm | 0.0008 ≤ Δnxy ≤ 0.010 | −0.0220 ≤ Δnxz ≤ −0.0030 |

Further, the first polarizer is provided with a protective layer laminated to a surface thereof on a side opposite to the first retardation layer, wherein the protective layer has a thickness of 50 μm or less, and exhibits a moisture permeability of 200 g/m$^2$ or less.

In the first aspect of the present invention, a thickness of a laminate comprising the first polarizer, the first and second retardation layers and the protective layer provided on the first polarizer is 105 μm plus a thickness of a pressure-sensitive adhesive layer, at a maximum, in a preferred embodiment, about 90 μm plus a thickness of a pressure-sensitive adhesive layer. Thus, the liquid crystal panel of the present invention is significantly reduced in thickness as compared to conventional liquid crystal panels.

A polarizer having a thickness of 10 μm or less and exhibiting the above optical properties represented by a single transmittance and a polarization degree can be produced by a method described in any one of the Patent Documents 4, 5 and 6 proposed by the applicant of this application.

In the aforementioned aspect of the present invention, the in-plane refractive index difference Δnxy of the first retardation layer is 0.0036 or more, and the thicknesswise refractive index difference Δnxz of the first retardation layer is 0.0041 or more. By determining the refractive index differences in this manner, it becomes possible to achieve a reduction in thickness of the first retardation layer while realizing values of the in-plane retardation Re and the thicknesswise retardation Rth necessary for optical compensation.

The in-plane refractive index difference Δnxy of the second retardation layer is 0.0008 or more, and the thicknesswise refractive index difference Δnxz of the second retardation layer is −0.0030 or less. By setting the refractive index differences in this manner, it becomes possible to achieve a reduction in thickness of the second retardation layer while realizing values of the in-plane retardation Re and the thicknesswise retardation Rth necessary for optical compensation.

Both of the first and second polarizers have a thickness of 10 μm or less. By determining the thickness of the polarizer to 10 μm or less, it becomes possible to suppress an influence of a stress due to expansion and contraction occurring in the polarizer along with surrounding environmental changes, on an adjacent layer. In the case where a polarizer has a relatively large thickness, for example, of 25 to 30 μm, as in conventional liquid crystal panels, relatively large expansion and contraction forces are produced in the polarizer, so that it becomes necessary to laminate a protective layer or a retardation layer having a thickness enough to suppress the expansion and contraction of the polarizer. In the first aspect of the present invention, each of the polarizers is thinned to reduce expansion and contraction forces which can be produced in the polarizer, so that it becomes possible to reduce a thickness of the protective layer or the retardation layer to be laminated to the polarizer.

The moisture permeability of the protective layer is 200 g/m² or less. A polarizer has a problem that a reduction in thickness thereof causes deterioration in humidity resistance. Thus, the moisture permeability of the protective layer is set to a relatively small value as above. This makes it possible to suppress degradation of the polarizer due to humidity to thereby allow the polarizer to be reduced in thickness.

In the aforementioned aspect of the present invention, the moisture permeability of the first retardation layer located on a near side with respect to the first polarizer is 200 g/m² or less. By setting the moisture permeability of the first retardation layer to a relatively small value as above, it becomes possible to suppress degradation of the polarizer due to humidity to thereby allow the polarizer to be reduced in thickness, as with the aforementioned case of the protective layer.

In the case where the protective layer is disposed on a viewing side of a liquid crystal display device, one or both of an anti-glare layer and an anti-reflection layer may be provided on an outer surface thereof.

According to a second aspect of the present invention, there is provided a laminate of polarizer and retardation layers. The laminate is designed for use, in a liquid crystal panel which comprises a liquid crystal cell having a liquid crystal layer containing liquid crystal molecules oriented in one direction in a plane thereof in an electric field-off state, and a pair of polarizers disposed, respectively, on opposite sides of the liquid crystal cell in such a manner that absorption axes thereof orthogonally intersect each other, wherein the laminate is located between the liquid crystal cell and one of the polarizers.

The laminate includes a first retardation layer disposed adjacent to the one polarizer, and a second retardation layer laminated to the first retardation layer. The first retardation layer is configured to satisfy the relationship of $nx1>ny1 \geq nz1$, where nx1 represents a refractive index in an in-plane slow axis (x-axis) direction, ny1 represents a refractive index in an in-plane fast axis (y-axis) direction, and nz1 represents a refractive index in a thickness-wise (z-axis) direction, whereas the second retardation layer is configured to satisfy the relationship of $nz2>nx2>ny2$, where nx2 represents a refractive index in the in-plane slow axis (x-axis) direction, ny2 represents a refractive index in the in-plane fast axis (y-axis) direction, and nz2 represents a refractive index in the thickness-wise (z-axis) direction, wherein the slow axis of the first retardation layer is disposed parallel to the slow axis of the second retardation layer.

The first retardation layer has a thickness of 25 μm or less, preferably, 3 to 25 μm, and exhibits a moisture permeability of 200 g/m² or less, wherein the value of Δnxy1 and the value of Δnxz1 are determined, respectively, to 0.0036 or more, preferably, 0.0036 to 0.014, and 0.0041 or more, preferably, 0.0041 to 0.0238, and Re and Rth are determined, respectively, in the range of 90 nm to 140 nm and the range of 100 nm to 240 nm, where Δnxy1 represents an in-plane refractive index difference in terms of a difference between the refractive index nx1 in the slow axis direction and the refractive index ny1 in the fast axis direction, Δnxz1 represents a thicknesswise refractive index difference in terms of a difference between the refractive index nx1 in the slow axis direction and the refractive index nz1 in the thickness-wise (z-axis) direction, Re represents an in-plane retardation, and Rth represents a thicknesswise retardation expressed in the formula Rth=(nx1−nz1)×d1, where d1 represents the thickness of the first retardation layer.

The second retardation layer has a thickness of 20 μm or less, preferably, 1 to 20 μm, wherein the value of Δnxy2 and the value of Δnxz2 are determined, respectively, to 0.0008 or more, preferably, 0.0008 to 0.010, and −0.0030 or less, and Re and Rth are determined, respectively, in the range of 15 nm to 50 nm and the range of −110 nm to −60 nm, where Δnxy2 represents an in-plane refractive index difference in terms of a difference between the refractive index nx2 in the slow axis direction and the refractive index ny2 in the fast axis direction, Δnxz2 represents a thicknesswise refractive index difference in terms of a difference between the refractive index nx2 in the slow axis direction and the refractive index nz2 in the thickness-wise (z-axis) direction, Re represents an in-plane retardation, and Rth represents a thicknesswise retardation expressed in the formula Rth=(nx2−nz2)×d2, where d2 represents the thickness of the second retardation layer.

Further, the slow axis of the first retardation layer is disposed parallel to the slow axis of the second retardation layer.

Generally, a polarizer is prepared by having a polyvinyl alcohol (PVA)-based layer impregnated with a dichroic material such that the dichroic material is adsorbed to the PVA-based layer, through a dyeing step, and uniaxially or biaxially stretching the PVA-based resin film to have the adsorbed dichroic material oriented in the stretch direction. In recent years, iodine has been commonly used as the dichroic material. In the dyeing step, the PVA-based resin film is immersed in an aqueous iodine solution. In this regard, however, iodine molecules ($I_2$) are not soluble in water by themselves. for the purpose, iodine is dissolved in water together with potassium iodide (KI) to prepare an aqueous iodine-potassium iodide solution. In the aqueous iodine-potassium iodide solution, in addition to potassium ions ($K^+$) and iodine ions ($I^-$), there exist polyiodide ions ($I_3^-$ and $I_5^-$) formed by coupling between iodine ions and an iodine molecule. In the dyeing step, iodine ions and polyiodide ions penetrate into the PVA-based resin film and are adsorbed onto the molecules of the PVA-based resin. Then, in the subsequent stretching step, when the PVA-based resin film is stretched and the molecules are oriented, the polyiodide ions are also oriented in a stretching direction. The transmittance of light entering into the dyed and stretched PVA-based resin varies depending on the angle of polarization direction of the entering light with respect to the orientation direction of the oriented polyiodide ions, so that the dyed and stretched PVA-based resin functions as a polarizer.

As above, polarizers comprise at least a PVA-based resin and polyiodide ions. In the polarizer, the polyiodide ions are present in a state in which they form PVA-iodine complexes ($PVA \cdot I_3^-$ and $PVA \cdot I_5^-$) by an interaction with the PVA-based resin. By forming such a complexes, an absorption dichroism is exhibited in a wavelength range of visible light. An iodine ion ($I^-$) has an absorption peak around 230 nm. A triiodide ion in a complexed state with PVA ($PVA \cdot I_3$) has an absorption peak around 470 nm. A pentaiodide ion in a complexed state with PVA ($PVA \cdot I_5^-$) has an absorption peak around 600 nm. A wavelength of light to be absorbed varies depending on a type of PVA-iodine complex, so that the polyiodide ion has a broad absorption peak. PVA-iodine complexes absorb visible light. On the other hand, an iodine ion has a peak around 230 nm, i.e., does not absorb visible light. Thus, the amount of polyiodide ions complexed with PVA exerts an influence on the performance of a polarizer in a display device such as a liquid crystal display device.

In the present invention, the thickness of each of the polarizers is 10 µm or less, preferably, 8 µm or less, particularly preferably, 6 µm or less. By having such thin thickness of the polarizer, it becomes possible to reduce expansion and contraction forces which can be produced in the polarizer along with surrounding environmental changes. In the case where a polarizer has a relatively large thickness, relatively large expansion and contraction forces are produced in the polarizer, so that it becomes necessary to laminate a protective layer or a retardation layer having a thickness enough to suppress expansion and contraction of the polarizer. In contrast, by having such a thin thickness of each of the polarizers to reduce expansion and contraction forces which can be produced in the polarizer, it becomes possible to reduce the thickness of the protective layer or the retardation layer to be laminated to the polarizer, and reduce an overall thickness of the optical laminate. In addition, as a result of reducing the thickness of the polarizer to reduce expansion and contraction forces which can be produced in the polarizer along with surrounding environmental changes, it becomes possible to obtain an advantage of reducing a stress acting on a member laminated to the polarizer to suppress an optical distortion which can occur in the laminated member.

Preferably, each of the polarizers exhibits an absorption dichroism at any wavelength in a wavelength range of 380 nm to 780 nm. The single transmittance of the polarizer is preferably 40.0% or more, more preferably, 40.5% or more, further preferably, 41.0% or more, particularly preferably 41.5% or more. The polarization degree of the polarizer is preferably 99.8% or more, more preferably, 99.9% or more, further preferably, 99.95% or more. It is not easy to produce such a thinned polarizer exhibiting high polarization performance. However, a thinned polarizer with desired properties can be produced by employing a method described in any one of the Patent Documents 4, 5 and 6 proposed by the applicant of this application.

As the protective layer, any suitable resin film may be employed as long as it can satisfy the following moisture permeability requirement under the following thickness condition. Examples of a material suitably usable in the present invention to form the protective layer include: a cycloolefin-based resin such as a norbornene-based resin; an olefin-based resin such as polyethylene or polypropylene; a polyester-based resin; and a (meth)acrylic-based resin. It should be noted that the term "(meth)acrylic-based resin" herein means an acrylic-based resin and/or a methacrylic-based resin.

The thickness of the protective layer is 50 µm or less, typically, 10 µm to 50 µm, preferably, 15 µm to 45 µm. In the case where the protective layer is disposed on a viewing side of a liquid crystal display device, a surface treatment layer such as an anti-glare layer or an anti-reflection layer may be provided, as mentioned above.

The moisture permeability of the protective layer is 200 g/m² or less, preferably, 170 g/m² or less, more preferably, 130 g/m² or less, particularly preferably, 90 g/m² or less. Each of the polarizers used in the present invention has a thickness of 10 µm or less. Generally, a polarizer has a problem that a reduction in thickness thereof causes deterioration in humidity resistance. Thus, the moisture permeability of the protective layer is set to a relatively small value as above. This makes it possible to suppress degradation of the polarizer due to humidity to thereby allow the polarizer to be reduced in thickness. By allowing the polarizer to be reduced in thickness, the thickness of the protective layer or the retardation layer to be laminated to this polarizer can also be reduced, as mentioned above, so that it becomes possible to reduce an overall thickness of the optical laminate.

A material usable for the first retardation layer must be capable of satisfying the above moisture permeability requirement. Examples of the usable material may include: a polycarbonate-based resin; a polyester-based resin such as polyethylene terephthalate or polyethylene naphthalate; a polyarylate-based resin; a polyimide-based resin; a cyclic polyolefin-based (polynorbornene-based) resin; a polyamide resin; and a polyolefin-based resin such as polyethylene or polypropylene.

Examples of a preferred material usable for the second retardation layer may include an acrylic-based resin, a styrene-based resin, a maleimide-based resin and a fumarate-based resin. However, the usable material is not particularly limited, but may be any polymer material having a negative birefringence. The term "having a negative birefringence" means a property that, when a polymer is oriented by means of stretching or the like, a refractive index in an orientation direction thereof becomes relatively small, in other words, a refractive index in a direction perpendicular to the orientation direction becomes relatively large. Examples of such a polymer include a polymer in which a chemical bond or a functional group having large polarization anisotropy, such as an aromatic group or a carbonyl group, is introduced into a side chain thereof.

[Meritorious Effects of the Invention]

As mentioned above, according to the present invention, each of the polarizer, and the retardation layer and the protective layer laminated to the polarizer, can be configured to be thin, so that it becomes possible to significantly reduce the overall thickness of the liquid crystal panel as compared to conventional liquid crystal panels. In addition, by having each of the refractive indexes of the first and second retardation layers laminated to the first polarizer within a specific range, it becomes possible to significantly reduce the thickness while achieving an intended optical compensation effect.

BRIEF DESCRIPTION OF DRAWINGS

FIG. 1 is a fragmentally cross-sectional view illustrating a liquid crystal panel according to one embodiment of the present invention.

DESCRIPTION OF EMBODIMENTS

FIG. 1 is a sectional view illustrating a liquid crystal panel according to one embodiment of the present invention. In this FIGURE, the liquid crystal panel 1 comprises an IPS-type liquid crystal cell 10. A first polarizer 11 and a second polarizer 21 are disposed, respectively, on the opposite sides of the liquid crystal cell 10. A first retardation layer 12 and a second retardation layer 13 are disposed between the first polarizer 11 and the liquid crystal cell 10, and arranged in this order from the side of the first polarizer 11.

Each of the first polarizer 11 and the second polarizer 21 is a type obtained by impregnating a stretched polyvinyl alcohol-based resin layer with iodine, wherein each of them has a thickness of 10 µm or less, typically, 5 µm. As the first polarizer 11, a type exhibiting optical properties including a single transmittance of 40.8% and a polarization degree of 99.99% or more is typically used. As the second polarizer 21, a type exhibiting optical properties including a single transmittance of 42.8% and a polarization degree of 99.95% or more is typically used.

The first retardation layer 12 may be formed using any one of the materials presented as examples suitable for the first retardation layer-forming material. It has a thickness, typically, of 25 µm. The first retardation layer 12 is configured to satisfy optical properties including the aforementioned moisture permeability and refractive index, and bonded to a surface of the first polarizer 11.

The second retardation layer 13 may be formed using any one of the materials presented as examples suitable for the second retardation layer-forming material. It has a thickness, typically, of 20 µm. The second retardation layer 13 is configured to satisfy optical properties including the aforementioned refractive index, and bonded to a surface of the first retardation layer 12 on a side opposite to the first polarizer 11 through a pressure-sensitive adhesive layer or adhesive layer 14. Further, the second retardation layer 13 is bonded to one of opposite surfaces of the liquid crystal cell 10 through a pressure-sensitive adhesive layer or adhesive layer 15.

For reducing the thickness of the laminate including the polarizer, it is preferable that each of the first retardation layer 12 and the second retardation layer 13 is laminated to the liquid crystal cell through an adhesive layer using a light-curable adhesive. In this case, preferably, the adhesive layer has a storage elastic modulus of $3 \times 10^5$ to $1 \times 10^8$ Pa (25° C.). If the storage elastic modulus is less than $3 \times 10^5$ Pa (25° C.), peeling is likely to occur due to poor adhesive force. On the other hand, if the storage elastic modulus is greater than $1 \times 10^8$ Pa (25° C.), peeling is likely to occur due to poor shock resistance.

The adhesive layer has a thickness, preferably, of 0.1 µm to 5.0 µm, more preferably, of 0.2 µm to 2.0 µm. If the thickness is less than 0.1 µm, peeling is likely to occur due to poor shock resistance.

The adhesive layer has a peel force (90°), preferably, of 0.5 N/15 mm width or more, more preferably, of 1.0 N/15 mm width or more. If the peel force is less than 0.5 N/15 mm width, peeling of the adhesive layer is likely to occur when a surface protective layer is peeled.

As a light-curable adhesive, it is possible to use a type obtained by irradiating with an activation energy ray a composition containing a radical polymerizable compound or an optical radical polymerization initiator, substantially without containing any organic solvent, and having a liquid viscosity of 1 to 100 cp/25° C.

As the radical polymerizable compound, it is possible to use a compound containing an N-vinyl compound and an acrylamide derivative, a (meth)acrylate compound having one (meth)acryloyl group, a (meth)acrylate compound having two or more (meth)acryloyl groups, or the like.

As the optical radical polymerization initiator, it is possible to use an initiator containing a thioxanthone-based initiator.

The above composition may further contain a silane coupling agent having at least one organic group selected from the group consisting of an amino group, an acid anhydride, an epoxy group, a triazine ring and a (meth)acryloyl group.

A protective layer 16 is bonded to a surface of the first polarizer 11 on a side opposite to the first retardation layer 12. The protective layer 16 has a thickness of 40 µm, and exhibits a moisture permeability, typically, of 80 g/m². An anti-reflection layer 17 is provided on an outer surface of the protective layer 16. The anti-reflection layer 17 has a thickness of 7 µm. Specifically, as the protective layer 16 with the anti-reflection layer 17, an acrylic-based protective film with anti-reflection function (DSG 11 produced by Dai Nippon Printing Co., Ltd., thickness: 47 µm) may be used. Instead of or in addition to the anti-reflection layer 17, an optical film such as a brightness-enhancing film may be used.

The second polarizer 21 is bonded to the other surface of the liquid crystal cell 10 through a pressure-sensitive adhesive layer 22. A protective layer 23 is bonded to a surface of the second polarizer 21 on a side opposite to the liquid crystal cell 10. The protective layer 23 may have the same configuration as that of the protective layer 16. A brightness-enhancing film 25 is bonded to an outer surface of the protective layer 23 through a pressure-sensitive adhesive layer 24.

When the liquid crystal panel having the above configuration is used in the O-mode, a side of the brightness-enhancing film 25 is positioned on a light source side, and a side of the anti-reflection layer 17 is positioned on a viewing side. On the other hand, when used in the E-mode, the side of the brightness-enhancing film 25 is positioned on the viewing side, and the side of the anti-reflection layer 17 is positioned on the light source side.

EXAMPLES

An example of production of a liquid crystal panel according to the present invention and an evaluation method for the liquid crystal will be described below.

[Measurement of Transmittance and Polarization Degree of Polarizer]

A single transmittance T, a parallel transmittance Tp and a crossed transmittance Tc of a polarizer was measured using a UV-visible spectrophotometer (V7100 produced by JASCO Corporation). As used therein, the term "parallel transmittance" means a transmittance measured when two polarizers having the same configuration are laminated to allow absorption axes thereof to become parallel to each other, and the term "crossed transmittance" means a transmittance measured when the two polarizers having the same configuration are laminated to allow the absorption axes thereof to orthogonally intersect each other. On the other hand, the term "single transmittance" means a transmittance of a single polarizer. Each value of T, Tp and Tc is a Y value measured by the 2-degree visual field (C light source) of JIS Z8701 and corrected for spectral luminous efficacy. The measurement was performed in a state in which a protective layer (acrylic-based resin film or cycloolefin-based resin film) was laminated to the polarizer in order to facilitate handling of the polarizer. Light absorption of the protective layer is negligibly small as compared to light absorption of the polarizer. Thus, a transmittance of a laminate obtained by laminating the protective layer to the polarizer was determined as a transmittance of the polarizer.

The polarization degree P is derived from the following formula by using the above parallel transmittance and crossed transmittance.

$$\text{Polarization degree } P=\{(Tp-Tc)/(Tp+Tc)\}^{1/2} \times 100$$

[Measurement of Thickness]

A thickness of each of the polarizer and the protective layer was measured using a digital micrometer (KC-351C produced by Anritsu Corporation).

[Measurement of Moisture Permeability]

Moisture permeability was measured based on the moisture permeability test method for moisture-proof packaging material (cup method) described in JIS Z 0208.

[Production of First Polarizer]

An amorphous-polyethylene terephthalate (A-PET) film (produced by Mitsubishi Plastics, Inc., trade name: NOVA-CLEAR SH046, thickness: 200 μm) was preliminarily prepared as a substrate, and a surface thereof was subjected to a corona treatment (58 W/m$^2$/min) Further, PVA (polymerization degree: 4,200, saponification degree: 99.2%) added with 1 wt % of an acetoacetyl-modified PVA (produced by The Nippon Synthetic Chemical Industry Co., Ltd., trade name "GOHSEFIMER Z200" (polymerization degree: 1,200, saponification degree: 99.0% or more, acetoacetyl modification degree: 4.6%)) was preliminarily prepared, and applied to the corona-treated surface of the substrate to form a film thereon in such a manner as to allow the film to have a thickness of 12 μm after drying. Then, the film was dried by hot air in an atmosphere at 60° C. for 10 minutes to prepare a laminate of the substrate and a PVA-based resin layer provided on the substrate.

Subsequently, the laminate was stretched in air at 130° C., at a stretching ratio of 2.0 times, to form a stretched laminate. Then, a step of immersing the stretched laminate in an insolubilizing aqueous boric acid solution at a solution temperature of 30° C. for 30 seconds to insolubilize a PVA layer comprised in the stretched laminate and containing oriented PVA molecules was performed. The insolubilizing aqueous boric acid solution in this step contained 3 weight parts of boric acid with respect to 100 weight parts of water. The stretched laminate after the insolubilization step was dyed to form a dyed laminate. This dyed laminate was obtained by immersing the stretched laminate in a dyeing solution to adsorb iodine to the PVA layer comprised in the stretched laminate. The dyeing solution contained iodine and potassium iodide. A solution temperature of the dyeing solution was set at 30° C., and an iodine concentration and a potassium iodide were set, respectively, in the range of 0.08 to 0.25 weight % and in the range of 0.56 to 1.75 weight %, using water as a solvent. A concentration ratio of iodine to potassium iodide was set to 1:7. As dyeing conditions, the iodine concentration and an immersion time were set to allow a single transmittance of a PVA-based resin layer constituting a polarizer to become 40.9%.

Subsequently, a step of immersing the dyed laminate in a cross-linking aqueous boric acid solution at 30° C. for 60 minutes to subject PVA molecules of the PVA layer having iodine adsorbed thereto to a cross-linking treatment. The cross-linking aqueous boric acid solution in this cross-linking step contained 3 weight parts of boric acid with respect to 100 weight parts of water, and 3 weight parts of potassium iodide with respect to 100 weight parts of water. Then, the obtained dyed laminate was further stretched in an aqueous boric acid solution at a stretching temperature of 70° C., in the same direction as that in the previous in-air stretching, at a stretching ratio of 2.7 times to attain an ultimate total stretching ratio of 5.4 times, thereby obtaining an optical film laminate comprising a polarizer for test sample. The aqueous boric acid solution used in this stretching step contained 4.0 weight parts of boric acid with respect to 100 weight parts of water, and 5 weight parts of potassium iodide with respect to 100 weight parts of water. The obtained optical film laminate was taken out from the aqueous boric acid solution, and boric acid adhering onto a surface of the PVA layer was washed away by an aqueous solution containing 4 weight parts of potassium iodide with respect to 100 weight parts of water. The washed optical film laminate was dried through a drying step using a hot air at 60° C. to obtain a 5 μm-thick polarizer laminated to the PET film.

[Production of Second Polarizer]

Except that the iodine concentration of the dyeing solution or bath and the immersion time were changed to allow a PVA layer constituting a finally-formed polarizer to have a single transmittance of 42.8%, a second polarizer was prepared in the same manner as that for the first polarizer.

[Production of Protective Layer]

Methacrylic resin pellets having a glutarimide ring unit were dried under 100.5 kPa at 100° C. for 12 hours, and extruded from a T-die at a die temperature of 270° C. by using a single-screw extruder to form a film. Then, this film was stretched in a conveyance direction thereof (hereinafter referred to as "the MD direction") in an atmosphere at a temperature higher than a glass transition temperature Tg of the resin by 10° C., and further stretched in a direction perpendicular to the MD direction (this direction will hereinafter be referred to as "the TD direction") in an atmosphere at a temperature higher than the glass transition temperature Tg of the resin by 7° C., to obtain a 40 μm-thick acrylic-based protective film.

[Protective Film of First Polarizer]

An acrylic-based protective film with anti-reflection function (DSG 11 produced by Dai Nippon Printing Co., Ltd., thickness: 47 μm) was used.

Production Examples

Example of Production of First Retardation Layer

Production Example N-1

A commercially-available polymer film consisting mainly of a cyclic polyolefin-based polymer (produced by LSR Corporation, trade name "ARTON FILM FEKP 100 (thickness: 100 μm)") was subjected to fixed-end uniaxial stretching using a tenter stretching machine, in a width direction (TD direction) at 147° C., in such a manner as to have a film width 4.3 times greater than its original film width (transverse stretching step). The obtained film had a thickness of 23 μm, and was a negative biaxial plate having a fast axis in the MD direction (nx>ny>nz).

Production Example N-2

A commercially-available polymer film consisting mainly of a cyclic polyolefin-based polymer (produced by LSR Corporation, trade name "ARTON FILM FEKP 130 (thickness: 130 μm)") was subjected to fixed-end uniaxial stretching using a tenter stretching machine, in a width direction at 145° C., in such a manner as to have a film width 3.0 times greater than its original film width (transverse stretching step). The obtained film had a thickness of 20 μm, and was a negative biaxial plate having a fast axis in the MD direction (nx>ny>nz).

Production Example N-3

A composition obtained by melting and mixing a cyclic olefin-based resin (ZEONOR 1420R produced by ZEON Corporation) using a twin-screw melt extruder was extruded using a single-screw extruder having a T-die attached thereto to obtain a 30 μm-thick cyclic olefin-based resin film.

The obtained film was subjected to fixed-end uniaxial stretching using a tenter stretching machine, in a width direction at 145° C., in such a manner as to have a film width 4.3 times greater than its original film width (transverse stretching step). The obtained film had a thickness of 7 μm, and was a negative biaxial plate having a fast axis in the MD direction (nx>ny>nz).

Production Example N-4

A commercially-available polymer film consisting mainly of a cyclic polyolefin-based polymer (produced by LSR Corporation, trade name "ARTON FILM FEKP 100 (thickness: 130 μm)") was subjected to fixed-end uniaxial stretching using a tenter stretching machine, in a width direction at 147° C., in such a manner as to have a film width 3.4 times greater than its original film width (transverse stretching step). The obtained film had a thickness of 38 μm, and was a negative biaxial plate having a fast axis in the MD direction (nx>ny>nz).

[Example of Production of Second Retardation Layer]
(Synthesis of Fumarate-Based Resin)

48 g of hydroxypropyl methylcellulose (produced by Shin-Etsu Chemical Co., Ltd., trade name: METOLOSE 60SH-50), 15601 g of distilled water, 8161 g of fumaric acid diisopropyl ester, 240 g of methacrylic acid (3-ethyl-3-oxetanyl)methyl ester and 45 g of t-butyl peroxypivalate serving as a polymerization initiator were put in a 30-L autoclave equipped with a stirrer, a cooling tube, a nitrogen inlet tube and a thermometer. Subsequently, the mixture was subjected to nitrogen bubbling for one hour, and then held at 49° C. for 24 hours under stirring at 200 rpm to induce radical suspension polymerization. Then, the solution was cooled to room temperature, and a suspension containing created polymer particles was centrifugally separated. The obtained polymer particles was washed twice by distilled water and twice by methanol, and then dried under reduced pressure at 80° C. (yield: 80%).

Production Example P-1

The obtained fumarate-based resin was dissolved in a toluene-methyl ethyl ketone mixed solution (toluene/methyl ethyl ketone: 50 weight %/50 weight %) to form a 20% solution thereof, and then 5 weight parts of tributyl trimellitate serving as a plasticizer was added with respect to 100 weight parts of the fumarate-based resin. The obtained solution was casted on a support substrate of a solution casting apparatus by a T-die method, and dried at 80° C. for 4 minutes and at 130° C. for 4 minutes to obtain a film having a width of 250 mm and a thickness of 18 μm. The obtained film was subjected to free-end uniaxial stretching using a roll stretching machine, in the MD direction at 150° C. and at a stretching ratio of 1.04 times (longitudinal stretching step). The obtained film had a thickness of 18 μm, and was a positive biaxial plate having a fast axis in the MD direction (nz>nx>ny).

Synthesis of Poly(nitrostyrene)

A solvent-based mixture of nitrobenzene (900 g) and 1,2-dichloroethane (300 g) was put in a three-neck round-bottom flask equipped with a mechanical stirrer, and polystyrene (50.0 g) was dissolved in the mixture under stirring. An acid mixture consisting of nitric acid (86.0 g) and concentrated sulfuric acid (100.0 g) (nitro/styrene equivalent ratio=2/1) was dripped into and added to the stirred mixture for 30 minutes. The obtained mixture was subjected to reaction under nitrogen at room temperature for a total time of 22 hours. The resulting yellow mixture was poured into sodium hydroxide diluted with water to separate an organic layer, and then the organic layer was precipitated in methanol to provide a piece of solid substance. The solid was solved in N,N-dimethylformamide (DMF), and re-precipitated in methanol. The obtained precipitate was subjected to stirring for 2 hours, filtering, repetitive washing with methanol, and drying under vacuum to obtain a slightly yellowish fibrous powder. A yield was 95% or more in total.

Production Example P-2

The obtained poly(nitrostyrene)-based resin was dissolved in cyclopentanone to form a 20% solution thereof, and the solution was casted on a support substrate of a solution casting apparatus by a T-die method. Then, the cast solution was dried at 40° C. for 4 minutes and at 130° C. for 4 minutes, and further dried under vacuum to obtain a film having a width of 250 mm and a thickness of 3 μm. The obtained film was subjected to free-end uniaxial stretching using a roll stretching machine, in the MD direction at 184° C. and at a stretching ratio of 1.06 times (longitudinal stretching step). The obtained film had a thickness of 3 μm, and was a positive biaxial plate having a fast axis in the MD direction (nz>nx>ny).

Production Example P-3

A pellet-shaped resin of polystyrene resin ("XAREC 130ZC" produced by Idemitsu Kosan Co., Ltd.) was extruded at 290° C. using a single-screw extruder and a T-die, and a resulting sheet-shaped molten resin was cooled by a cooling drum to obtain a 20 μm-thick film. This film was subjected to free-end uniaxial stretching using a roll stretching machine, in the MD direction at 125° C. and at a stretching ratio of 1.5 times to obtain a retardation film having a fast axis in the MD direction (longitudinal stretching step). The obtained film was further subjected to fixed-end uniaxial stretching using a tenter stretching machine, in a width direction at 130° C., in such a manner as to have a film width 1.6 times greater than a film width just after the above longitudinal stretching, thereby obtaining a 10 µm-thick biaxially-stretched film (transverse stretching step). The obtained film was a positive biaxial plate having a fast axis in the MD direction (nz>nx>ny).

Production Example P-4

A pellet-shaped resin of styrene-maleic anhydride polymer ("DYLARK D232" produced by NOVA Chemicals Japan Ltd.) was extruded at 270° C. using a single-screw extruder and a T-die, and a resulting sheet-shaped molten resin was cooled by a cooling drum to obtain a 77 µm-thick film. This film was subjected to free-end uniaxial stretching using a roll stretching machine, in the MD direction at 125° C. and at a stretching ratio of 1.7 times to obtain a retardation film having a fast axis in the MD direction (longitudinal stretching step). The obtained film was further subjected to fixed-end uniaxial stretching using a tenter stretching machine, in a width direction at 135° C., in such a manner as to have a film width 1.8 times greater than a film width just after the above longitudinal stretching, thereby obtaining a 33 µm-thick biaxially-stretched film (transverse stretching step). The obtained film was a positive biaxial plate having a fast axis in the MD direction (nz>nx>ny).

[Production of Laminate Consisting of First Polarizer, First Retardation Layer, Second Retardation Layer and Protective Layer]

The first retardation layer N-1 prepared in the above manner was laminated to the 5 µm-thick polarizer comprised in the laminate prepared in the example of production of the first polarizer, specifically, to a surface of the 5 µm-thick polarizer on a side opposite to the PET film of the laminate, through a UV-curable adhesive. Subsequently, after the PET film was peeled from the laminate, the acrylic-based protective film with anti-reflection function was laminated to the polarizer through a UV-curable adhesive. Then, the second retardation layer P-1 was further laminated to a surface of the resulting laminate on the side of the first retardation layer N-1, through an acrylic-based pressure-sensitive adhesive (thickness: 5 µm), in a roll-to-roll manner, i.e., under a condition that they are conveyed parallel to each other, thereby obtaining a first polarizing laminate.

[Production of Laminate Consisting of Second Polarizer and Protective Film]

The 40 µm-thick acrylic-based protective film was laminated to the 5 µm-thick polarizer comprised in the laminate prepared in the example of production of the second polarizer, specifically, to a surface of the 5 µm-thick polarizer on a side opposite to the PET film of the laminate, through a UV-curable adhesive. Subsequently, the PET film was peeled from the laminate to obtain a second polarizing plate (second polarizing laminate) laminated to the acrylic-based protective film.

[Production of Liquid Crystal Panel]

Example 1

From a slate type PC equipped with an IPS type liquid crystal cell (iPad Retina Display Model produced by Apple Inc.), the liquid crystal cell was taken out, and polarizing plates disposed on the top and bottom sides of the liquid crystal cell were removed. Then, opposite glass surfaces of the liquid crystal cell were cleaned by washing. Subsequently, the first polarizing plate produced in the above manner was laminated to the viewing-side surface of the liquid crystal cell with the absorption axis of the polarizer of the first polarizing laminate oriented in a direction perpendicular to the initial orientation direction of the liquid crystal cell, through an acrylic-based pressure-sensitive adhesive (thickness: 15 µm). Then, the second polarizing plate produced in the above manner was laminated to the illumination light source-side surface of the liquid crystal cell with the absorption axis of the polarizer of the second polarizing laminate oriented in a direction parallel to the initial orientation direction of the liquid crystal cell, through an acrylic-based pressure-sensitive adhesive (thickness: 15 µm).

Examples 2 to 3

In the example of production of a first polarizing plate, two different types of first polarizing plates were obtained using: the first retardation layer N-2 and the second retardation film P-2; and the first retardation layer N-3 and the second retardation film P-3, instead of the first retardation layer N-1 and the second retardation film P-1. Then, a liquid crystal panel was produced in the same manner as that in Example 1, using each of the obtained first polarizing plates.

Example 4

Except that, in the example of production of a first polarizing plate, each of the first retardation layer N-1 and the second retardation film P-1 was laminated through a light-curable adhesive (storage elastic modulus: $2.6 \times 10^6$, thickness: 2 µm), a liquid crystal panel was produced in the same manner as that in Example 1.

Example 5

Except that, in the example of production of a first polarizing plate, each of the first retardation layer N-2 and the second retardation film P-2 was laminated through a light-curable adhesive (storage elastic modulus: $4.0 \times 10^5$, thickness: 2 µm), a liquid crystal panel was produced in the same manner as that in Example 1.

Example 6

Except that, in the example of production of a first polarizing plate, each of the first retardation layer N-3 and the second retardation film P-3 was laminated through a light-curable adhesive (storage elastic modulus: $9.0 \times 10^7$, thickness: 2 µm), a liquid crystal panel was produced in the same manner as that in Example 1.

[Black-State Brightness]

A block image was displayed on a liquid crystal display device in a dark room at a room temperature of 23°, brightness (Y value in an XYZ color coordinate system) was measured using "EZContrast 160D (product name)" produced by ELDIM SA, and an average of black-state brightness in an azimuth range of 0 to 360° at a polar angle of 60° was calculated. A result of the calculation is presented in Table 2. In Table 2, the term "polar angle" means an inclination angle with respect to a normal line perpendicular to a screen of the liquid crystal display device, and the term "azimuth" means a counterclockwise angle with respect to a direction corresponding to three o'clock of a clock dial when viewing the screen from a front side thereof.

TABLE 2

| | | First retardation layer | | | | Average of black-state brightness (cd/cm²) |
|---|---|---|---|---|---|---|
| | | Negative B plate | | | | |
| | Material | Thickness | Δnxy | Δnxz | moisture permeability | |
| Example 1 | N-1 | 23 | 0.0048 | 0.0052 | 85 | 0.73 |
| Example 2 | N-2 | 20 | 0.0068 | 0.0095 | 98 | 0.74 |
| Example 3 | N-3 | 7 | 0.0129 | 0.0206 | 60 | 0.75 |
| Comparative Exampke 1 | N-4 | 38 | 0.0033 | 0.0039 | 78 | 0.75 |

| | | Second retardation layer | | | Average of black-state brightness (cd/cm²) |
|---|---|---|---|---|---|
| | | Positive B plate | | | |
| | Material | Thickness | Δnxy | Δnxz | |
| Example 1 | P-1 | 18 | 0.0014 | −0.0043 | 0.73 |
| Example 2 | P-2 | 3 | 0.0050 | −0.0217 | 0.74 |
| Example 3 | P-3 | 10 | 0.0045 | −0.0067 | 0.75 |
| Comparative Example 1 | P-4 | 33 | 0.0007 | −0.0026 | 0.75 |

In Examples, the iPad having a brightness-enhancing film was used as a liquid crystal panel for evaluation. Thus, as regards Examples in the Patent Document 3 using a TV panel as a liquid crystal panel, black-state brightness values in the above Table 2 are higher than those presented in Table 3 of the Patent Document 3. However, such black-state brightness values in the above Table 2 are at a sufficiently satisfactory level. The result also shows that the present invention can achieve a totally satisfying compensation effect, despite a reduction in thickness of the retardation layers. Each of the retardation layers in Examples (Inventive Examples) 1 to 3 has a thickness less than that of Comparative Example 1, and exhibits a black-state value less than, or, even at worst, equal to that of Comparative Example 1.

[Thickness of Polarizing Laminate]

The polarizing laminate comprising the protective layer, the polarizer, the first retardation layer and the second retardation layer which are laminated together was measured in thickness using a digital micrometer (KC-351C produced by Anritsu Corporation).

It has been verified that the polarizing laminate comprising the first retardation layer and the second retardation layer each laminated using a light-curable adhesive can achieve thickness reduction.

LIST OF REFERENCE SIGNS

1: liquid crystal panel
10: liquid crystal cell
11: first polarizer
12: first retardation layer
13: second retardation layer
14, 15: pressure-sensitive adhesive layer
16: protective layer
17: anti-reflection layer
21: second polarizer
22, 24: pressure-sensitive adhesive layer
23: protective layer
25: brightness-enhancing film

The invention claimed is:

1. A liquid crystal panel comprising:
a liquid crystal cell having a liquid crystal layer containing liquid crystal molecules oriented in one direction in a plane thereof in an electric field-off state;
a first polarizer disposed on a side of the liquid crystal cell;
a second polarizer disposed on a side of the liquid crystal cell opposite to the side of the liquid crystal cell having the first polarizer, the second polarizer having an absorption axis that orthogonally intersects an absorption axis of the first polarizer; and
a first retardation layer and a second retardation layer between the first polarizer and the liquid crystal cell and arranged in this order from a side of the first polarizer,
wherein
the second retardation layer is laminated to the liquid crystal cell through a light-sensitive adhesive layer, the light-sensitive adhesive layer having a storage elastic modulus of $3 \times 10^5$ to $1 \times 10^8$ Pa (25° C.),
the first retardation layer is configured to satisfy the relationship of nx1>ny1>nz1, where: nx1 represents a refractive index in an in-plane slow axis direction, ny1 represents a refractive index in an in-plane fast axis direction, and nz1 represents a refractive index in a thickness-wise direction, the second retardation

TABLE 3

| | First Retardation Layer | Second Retardation Layer | Pressure-sensitive adhesive/Adhesive | | Thickness of Polarizing plate |
|---|---|---|---|---|---|
| | Material | Material | Material | Thickness | (laminate) |
| Example 1 | N-1 | P-1 | Acrylic-based pressure-sensitive adhesive | 5 | 113 |
| Example 2 | N-2 | P-2 | Acrylic-based pressure-sensitive adhesive | 5 | 95 |
| Example 3 | N-3 | P-3 | Acrylic-based pressure-sensitive adhesive | 5 | 89 |
| Example 4 | N-1 | P-1 | Light-curable adhesive | 2 | 110 |
| Example 5 | N-2 | P-2 | Light-curable adhesive | 2 | 92 |
| Example 6 | N-3 | P-3 | Light-curable adhesive | 2 | 86 |
| Comparative Example 1 | N-4 | P-4 | Acrylic-based pressure-sensitive adhesive | 5 | 143 | layer is configured to satisfy the relationship of $nz2>nx2>ny2$, where $nx2$ represents a refractive index in the in-plane slow axis direction, $ny2$ represents a refractive index in the in-plane fast axis direction, and $nz2$ represents a refractive index in the thickness-wise direction, the slow axis of the first retardation layer is parallel to the slow axis of the second retardation layer, each of the first polarizer and the second polarizer have a thickness of 10 μm or less, with optical properties including a single transmittance of 40.0% or more and a polarization degree of 99.8% or more, the second polarizer is directly bonded to the liquid crystal cell through a pressure-sensitive adhesive layer with the absorption axis thereof being parallel to an orientation direction of the liquid crystal molecules of the liquid crystal cell in the electric field-off state, the second polarizer has a first protective layer laminated thereto at a side opposite to the liquid crystal cell, through a pressure-sensitive adhesive layer, the first protective layer has a thickness of 10 to 50 μm, with a moisture permeability of 200 g/m² or less, the first retardation layer has a thickness of 25 μm or less, with a moisture permeability of 200 g/m² or less, wherein a value of $\Delta nxy1$ and a value of $\Delta nxz1$ are, respectively, 0.0036 or more, and 0.0041 or more, and Re and Rth are, respectively, in the range of 90 nm to 140 nm and the range of 100 nm to 240 nm, where $\Delta nxy1$ represents a difference between the refractive index $nx1$ in the slow axis direction and the refractive index $ny1$ in the fast axis direction, $\Delta nxz1$ represents a difference between the refractive index $nx1$ in the slow axis direction and the refractive index $nz1$ in the thickness direction, Re represents an in-plane retardation, and Rth represents a thicknesswise retardation expressed in the formula $Rth=(nx1-nz1)\times d1$, where d1 represents a thickness of the first retardation layer, the second retardation layer has a thickness of 20 μm or less, wherein a value of $\Delta nxy2$ and a value of $\Delta nxz2$ are, respectively, 0.0008 or more, and −0.0030 or less, and Re and Rth are, respectively, in the range of 15 nm to 50 nm and the range of −110 nm to −60 nm, where $\Delta nxy2$ represents a difference between the refractive index $nx2$ in the slow axis direction and the refractive index $ny2$ in the fast axis direction, $\Delta nxz2$ represents a difference between the refractive index $nx2$ in the slow axis direction and the refractive index $nz2$ in the thickness direction, Re represents an in-plane retardation, and Rth represents a thicknesswise retardation expressed in the formula $Rth=(nx2-nz2)\times d2$, where d2 represents a thickness of the second retardation layer, the first polarizer has a second protective layer laminated thereto at a side opposite to the first retardation layer, the second protective layer has a thickness of 50 μm or and a moisture permeability of 200 g/m² or less, and the thickness of the first retardation layer is greater than the thickness of the second retardation layer.

2. A laminate of polarizer and retardation layers configured to be used in a liquid crystal panel which comprises a liquid crystal cell having a liquid crystal layer containing liquid crystal molecules oriented in one direction in a plane thereof in an electric field-off state, and a pair of polarizers disposed, respectively, on opposite sides of the liquid crystal cell with absorption axes thereof orthogonally intersecting each other, wherein the laminate is between the liquid crystal cell and one of the polarizers of the pair of polarizers, the laminate includes a first retardation layer disposed adjacent to the one polarizer, and a second retardation layer laminated to the first retardation layer through a light-sensitive adhesive layer, the light-sensitive adhesive layer having a storage elastic modulus of $3\times10^5$ to $1\times10^8$ Pa (25° C.), the first retardation layer is configured to satisfy the relationship of $nx1>ny1>nz1$, where $nx1$ represents a refractive index in an in-plane slow axis direction, $ny1$ represents a refractive index in an in-plane fast axis direction, and $nz1$ represents a refractive index in a thickness-wise direction, the second retardation layer is configured to satisfy the relationship of $nz2>nx2>ny2$, where $nx2$ represents a refractive index in the in-plane slow axis direction, $ny2$ represents a refractive index in the in-plane fast axis direction, and $nz2$ represents a refractive index in the thickness-wise direction, a slow axis of the first retardation layer is parallel to a slow axis of the second retardation layer, the first retardation layer has a thickness of 25 μm or less, with a moisture permeability of 200 g/m² or less, wherein a value of $\Delta nxy1$ and a value of $\Delta nxz1$ are, respectively, 0.0036 or more, and 0.0041 or more, and Re and Rth are, respectively, in the range of 90 nm to 140 nm and the range of 100 nm to 240 nm, where $\Delta nxy1$ represents a difference between the refractive index $nx1$ in the slow axis direction and the refractive index $ny1$ in the fast axis direction; $\Delta nxz1$ represents a difference between the refractive index $nx1$ in the slow axis direction and the refractive index $nz1$ in the thickness (z-axis) direction, and Re represents an in-plane retardation, and Rth represents a thicknesswise retardation expressed in the formula $Rth=(nx1-nz1)\times d1$, where d1 represents a thickness of the first retardation layer, the second retardation layer has a thickness of 20 μm or less, wherein a value of $\Delta nxy2$ and a value of $\Delta nxz2$ are, respectively, 0.0008 or more, and −0.0030 or less, and Re and Rth are, respectively, in the range of 15 nm to 50 nm and the range of −110 nm to −60 nm, where $\Delta nxy2$ represents a difference between the refractive index $nx2$ in the slow axis direction and the refractive index $ny2$ in the fast axis direction, $\Delta nxz2$ represents a difference between the refractive index $nx2$ in the slow axis direction and the refractive index $nz2$ in the thickness-wise direction; Re represents an in-plane retardation, and Rth represents a thicknesswise retardation expressed in the formula $Rth=(nx2-nz2)\times d2$, where d2 represents a thickness of the second retardation layer, and the thickness of the first retardation layer is greater than the thickness of the second retardation layer.

* * * * *